United States Patent [19]

Shiomi et al.

[11] 4,185,880
[45] Jan. 29, 1980

[54] STRUCTURE FOR SUPPORTING A STEERING COLUMN MAIN SHAFT

[75] Inventors: Masanao Shiomi; Shigetoshi Miyoshi, both of Toyota, Japan

[73] Assignee: Toyota Jidosha Kogyo Kabushiki Kaisha, Toyota, Japan

[21] Appl. No.: 922,771

[22] Filed: Jul. 7, 1978

[30] Foreign Application Priority Data

Jan. 30, 1978 [JP] Japan ................................. 53/9094

[51] Int. Cl.² ........................ F16C 23/08; F16C 25/08
[52] U.S. Cl. .................................. 308/189 R; 74/492; 308/189 A; 308/194
[58] Field of Search .................... 74/492, 493; 308/72, 308/189 R, 194, 196, 219, 189 A

[56] References Cited

U.S. PATENT DOCUMENTS

| 2,975,007 | 3/1961 | Zwicker | 308/194 |
| 3,486,396 | 12/1969 | Yoshioka et al. | 74/492 |
| 3,600,969 | 8/1971 | Pitner | 74/492 |
| 3,893,348 | 7/1975 | Rieth et al. | 74/492 |

Primary Examiner—Douglas C. Butler
Attorney, Agent, or Firm—Finnegan, Henderson, Farabow & Garrett

[57] ABSTRACT

A structure for supporting the main shaft of a steering column with its upper end being journalled in a first bearing structure and its lower end in a second bearing structure, wherein the second bearing structure is adapted to support the shaft in such a manner as to allow the shaft to rotate about its axis as well as to pivot about a point on the axis.

2 Claims, 2 Drawing Figures

STRUCTURE FOR SUPPORTING A STEERING COLUMN MAIN SHAFT

BACKGROUND OF THE INVENTION

The present invention relates to an automotive steering system, and more particularly to a structure for supporting a steering column main shaft incorporated in the steering system.

Conventionally, a steering main shaft is generally housed in a tubular member called a "column tube" or "shift tube " and is journalled in bearings at both the upper and lower ends thereof in such a manner that the shaft is protected by the tubular member. In such a steering shaft supporting structure employing a column tube, even if any error or misalignment should occur in manufacture or assembly of the structure, thereby generating undesirable stresses therein, such stresses would be borne by the column tube and precluded from acting on the steering main shaft.

However, as a way to improve safety of the vehicle, it has recently been proposed to construct a steering main shaft as an impact absorbing type shaft which collapses and shortens axially when an axial force greater than a predetermined amount is applied thereto, and which therefore absorbs impact energy. This type of steering main shaft is not mounted within or protected by any column tube, as in conventional steering systems as described above, but is installed with its principal portion being unprotected or bared. Such a steering main shaft might be subjected to dangerous bending stresses due to unavoidable manufacturing error or misalignment involved in the structures which rotatably support it at both its upper and lower ends.

SUMMARY OF THE INVENTION

It is therefore the object of the present invention to provide an improved structure for supporting a steering main shaft which is able to absorb or compensate for manufacturing error or misalignment involved in the structures and which therefore provides stable attachment of the steering main shaft without any bending stresses being caused therein.

In accordance with the present invention, the above-mentioned object is accomplished by providing a structure for supporting a steering main shaft comprising first and second bearing structures which rotatably support upper and lower end portions of said shaft respectively, wherein said second bearing structure is so adapted as to allow for pivotal movement of said steering main shaft about a point on the axis of said shaft with three degrees of freedom.

A steering main shaft is generally supported at its upper end by an upper bearing structure incorporated in an upper bracket and at its lower end which passes through a column hole formed in the dash panel by a lower bearing structure which is in turn supported by the dash panel at the column hole portion. The present invention contemplates construction of the lower or second bearing structure, which supports the steering main shaft at a portion where it penetrates the dash panel, so as to allow for pivotal movement of the shaft about a point on the axis of the shaft with three degrees of freedom. By the lower end portion of the steering main shaft being supported in the aforementioned pivotal manner at the portion where it penetrates the dash panel, the shaft can be installed without being subjected to any bending stresses since a proper fine-adjustment of the inclination of the shaft is available, so as to absorb or compensate for manufacturing error or misalignment involved in the mounting structure. In this case, the upper bearing structure, which is incorporated in the upper bracket and supports the upper end of the shaft, may be a simple bearing which supports the shaft for rotation about its axis, and it be only required that the upper bracket is attached to a corresponding portion of the body of the vehicle in a manner such that the axis of the upper bearing structure incorporated therein should be in accurate alignment with the axis of the shaft.

BRIEF DESCRIPTION OF THE DRAWINGS

The present invention will become more fully understood from the detailed description given hereinbelow and the accompanying drawings which are given by way of illustration only and are not intended to limit the scope of the present invention, and in which.

DESCRIPTION OF THE PREFERRED EMBODIMENT

Figure 1:
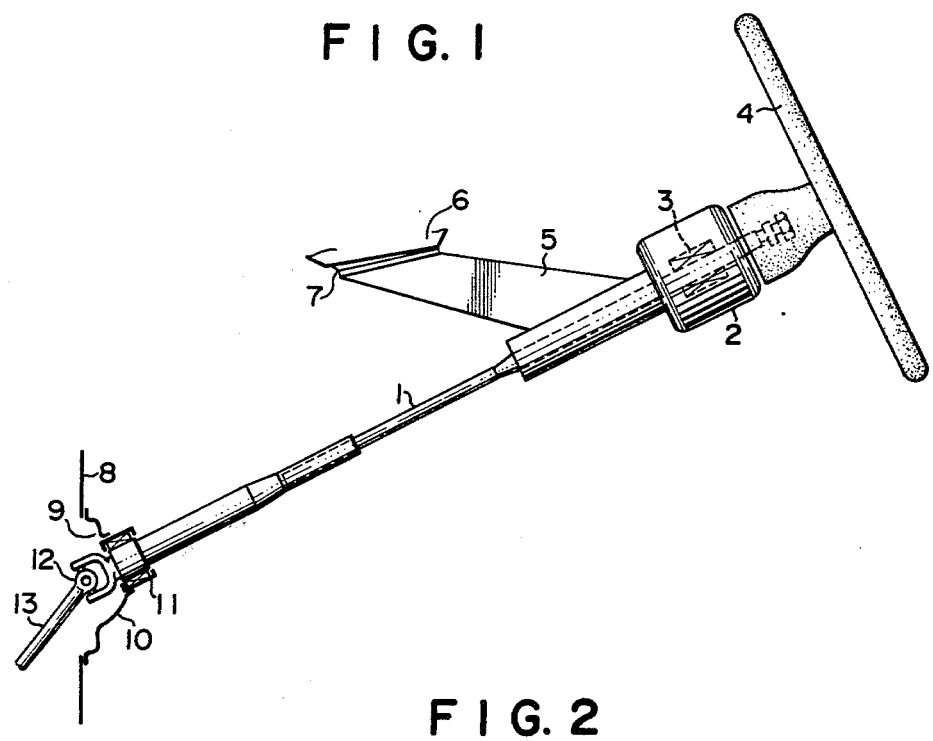
FIG. 1 is a schematic side view of a steering column in which the present invention is incorporated.

Referring to FIG. 1, 1 designates a steering column main shaft, which is of the type which has a section which contains silicon rubber and is adapted to collapse and to shorten axially when an axial force beyond a predetermined value is applied thereto, thereby absorbing the axial force. The upper end of the shaft is supported by an upper bracket 2 by way of a first or upper bearing structure 3 incorporated therein. A steering wheel is mounted at the uppermost end of the shaft. The upper bracket 2 is attached at its leg portion to the body 6 of a vehicle. A caster wedge or shim 7 is inserted between the leg portion and the body for the purpose of adjusting the mounting position.

The lower end of the steering main shaft 1 passes through a column hole 9 formed in the dash panel 8 where it is journalled in a bearing means 11 which is in turn supported by a column hole cover 10. According to the present invention, the structure is so constructed that the steering main shaft is supported so as to be tiltable about a pivotal point on its axis as well as to be rotatable about its axis. A universal joint 12 is incorporated in the lowermost extremity of the shaft which extends beyond the lower end portion of the shaft supported by the bearing means 11. The steering main shaft turns a rod 13 through the universal joint, which drives other members of the steering system which are not shown in the figure. It will be understood, however, that any type of coupling device other than a universal joint may equally be used.

Figure 2:
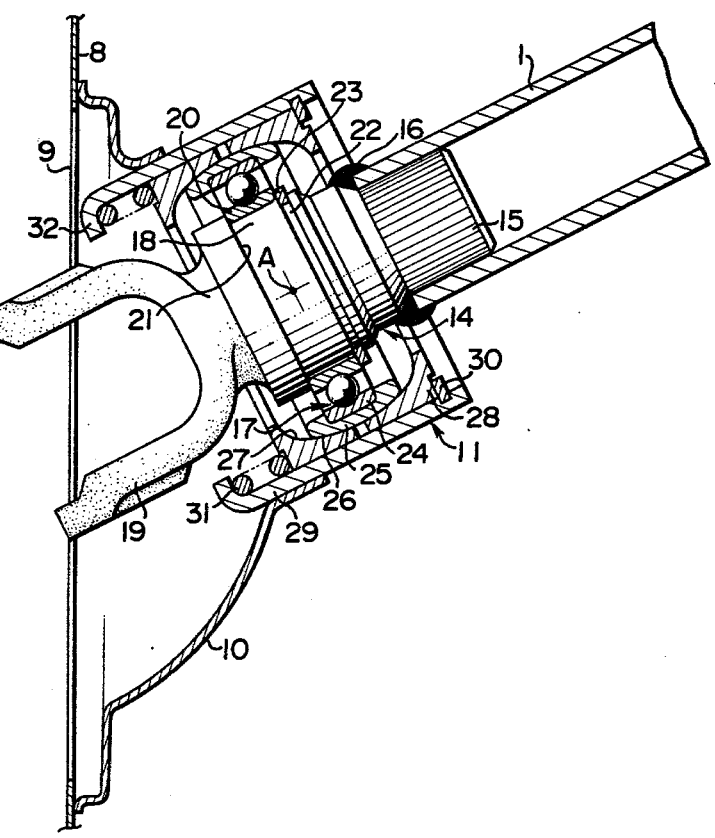
FIG. 2 is an enlarged sectional view of the bearing means shown in FIG. 1.

Referring now to FIG. 2, the lower portion of the steering main shaft 1 is of tubular form and a bearing member 14 is securely attached to the shaft by a weld bead 16 with a plug portion 15 of the bearing member being inserted into the tubular end of the main shaft. The bearing member 14 comprises an integral bearing portion 18 for receiving a ball bearing 17 and an integral yoke portion 19 which is one of the yokes which construct the universal joint 12. The inner race 20 of the ball bearing 17 is mounted on the bearing portion 18 and is held in place with one side thereof abutting against a shoulder 21 of the bearing portion 18 and the other side thereof being retained by a snap ring 23 mounted in an annular groove 22 formed in the bearing portion. The outer race 24 of the ball bearing 17 is held in a ring element 25 which has an outer spherical surface 26 corresponding to the inner spherical surface 27 of a ring element 28. The ring element 28 is received in a housing 29 and is urged by a compression coil spring 31 toward a position where it abuts against a snap ring 30 fitted in the inner cylindrical surface of the housing. In the assembly process, the compression coil spring 31 is first mounted in the housing so as to seat on a flanged portion formed in the lower end of the housing 29, and then the ring element 28 is inserted into the housing through its open end, which is the right side in the figure, and thereafter the snap ring 30 is fitted in the inner cylindrical surface of the housing, which is supported by the dash panel 8 by way of the column hole cover 10.

In this arrangement, the outer spherical surface 26 of the ring element 25 and the inner spherical surface 27 of the ring element 28 have the common center point A. Therefore, the bearing means 11 constructed as above supports the steering main shaft 1 so as to be tiltable or pivotable about point A on its axis, and also to be rotatable about its own axis. Thus, in installing the steering main shaft the inclination of the shaft can be adjusted as desired over a range of angles without exerting any undesirable bending stresses on the shaft or other members.

When the steering main shaft 1 is installed in the vehicle by employing the bearing means 11, the lower end of the shaft is first mounted to the dash panel 8 by way of the bearing means 11 and the column hole cover 10, as shown in FIG. 1, and then the upper bracket 2 is fixed to the body 6 of the vehicle at its leg portion 5 in a manner such that the axis of the bearing means 3 incorporated in the upper bracket is in alignment with that of the steering main shaft 1. It will be understood that the desired positioning of the upper bracket is readily obtained by properly adjusting the caster wedge or shim 7 in thickness, angle and/or position.

Although the invention has been shown and described in connection with a steering main shaft of the type which has a section containing silicon rubber therein and is adapted to collapse and to shorten axially when an excessive axial force is applied thereto, it should be understood that the present invention is also applicable to other types of steering shafts, and that, therefore, although the invention has been shown and described with respect to a preferred embodiment thereof, various changes and omissions of the form and detail thereof may be made therein by one of ordinary skill in the art, without departing from the scope of the invention.

We claim:

1. A structure for supporting a steering main shaft comprising first and second bearing structures which rotatably support upper and lower end portions of said shaft, respectively, said second bearing structure permitting pivotal movement of said steering main shaft about a point on the axis of said shaft with three degrees of freedom, said second bearing structure comprising a housing, an outer ring element movably disposed in said housing for movement along the axis of said shaft relative to said housing and having a spherically concave inner surface, a spring disposed between said housing and said outer ring element for biasing said outer ring element relative to said housing along the axis of said shaft in a direction toward said upper end, an inner ring element having a spherically convex outer surface which is complementary to and is received by said spherically concave inner surface, and ball bearing means having outer and inner races and balls engaged therebetween, said outer race being secured to said inner ring element and said inner race being secured to the lower end portion of said shaft.

2. The structure of claim 1, wherein said shaft comprises a bearing member which forms the lower end portion of said shaft, said bearing member having an integral bearing portion which receives said inner race of said ball bearing means and an integral yoke portion which forms a portion of a universal joint.

* * * * *